2,899,269

METHOD OF PREPARING METAL FLUORIDES

Joseph J. Katz, Chicago, and Irving Sheft, Oak Park, Ill., assignors to the United States of America as represented by the United States Atomic Energy Commission No Drawing. Application December 1, 1952
Serial No. 323,514

7 Claims. (Cl. 23—14.5)

The present invention is concerned with a method of preparing metallic halides, and more particularly with an improved method of preparing the halides of elements which are relatively non-reactive with halogenating agents.

The non-volatile fluorides of various metallic elements are important intermediates in the preparation of the metals themselves. Thus, many of the rarer metals are prepared by the reduction of their non-volatile fluorides with a metal of the alkaline earth family. One method of preparing the intermediate fluorides is the direct fluorination of the oxygen-containing salts of the metal, such as the oxides, hydroxides and oxysalts, in particular the iodate and the phosphate. The fluorination of the oxides is particularly important since these are the salts which are usually recovered from the ores of the elements. The oxides of some metals readily react with halogenating elements to form volatile halides. One such group of elements is the VI–B, or molybdenum-type element. These include molybdenum and tungsten of the VI–B group of the periodic table, and uranium. Although uranium is now sometimes classed as an actinide rare earth, it is not the typical trivalent actinide rare earth, but in many of its reactions it is tetravalent or hexavalent and reacts more nearly like the elements of the VI–B group of the periodic table with which it was formerly identified. Other metallic elements, particularly the IV–B or zirconium-type elements, react very slowly or not at all with halogenating agents, such as bromine trifluoride, when they are directly treated with the halogenating agent. In some cases, where a partial reaction is achieved with a halogenating agent, the resultant product will be a mixture of the fluoride and oxygenated fluoride, such as $PuO_2F_2$, a product which is not suitable for use in the direct reduction to the metal state. The term "IV–B element" or "zirconium-type element" is used to refer to the predominantly tetravalent members of the IV–B group of the periodic table, such as zirconium and hafnium, and to the predominantly tetravalent members of the actinide rare earth series, such as thorium, neptunium and plutonium, which react similarly.

It is an object of the present invention to provide an improved method of halogenating the oxygen-containing salts of metals which are normally resistant to halogenation.

It is an additional object of the present invention to provide a method of producing the non-volatile fluorides of zirconium-type metal oxygen-containing salts.

A still further object of the present invention is to provide a method of producing non-volatile fluorides of zirconium-type salts and to provide a method of separating said zirconium-type compounds from impurities which form volatile fluorides.

Additional objects will be apparent from the description of the invention which follows.

We have discovered that non-volatile halides of the difficultly halogenated metals may be prepared by reacting a mixture of an oxygen-containing salt of a difficultly halogenated metal and an oxygen-containing salt of an easily halogenated metal with a halogenating agent. Thus, zirconium tetrafluoride may be formed by reacting a mixture of zirconium dioxide and molybdenum trioxide with bromine trifluoride. Similarly, plutonium tetrafluoride may be produced by reacting a mixture of plutonium dioxide and $U_3O_8$ with bromine trifluoride. The reaction proceeds smoothly at moderate temperatures and the resultant product, $PuF_3$, may be readily separated from many impurities which form volatile fluorides, such as $UF_6$, by volatilizing these volatile fluorides from the reaction chamber, leaving the purified $PuF_4$.

While the process of this invention may be used to convert many difficultly halogenated metallic compounds to the metal halide, it is particularly useful in the conversion of the zirconium-type metal oxides and oxysalts to zirconium-type metal fluorides. Thus, it may be used in producing the fluorides of zirconium, hafnium, thorium, neptunium and plutonium. While the oxide of the metallic salt is usually the starting material, since this is the compound most frequently encountered in metallic ores, the process is applicable to the halogenation of other oxygen-containing salts such as the hydroxide, the iodate, the phosphate, etc.

While there are several groups of metals the oxygen-containing salts of which readily react with halogenating agents to form volatile halides, we prefer to use the oxygen-containing salts of the VI–B, or molybdenum-type, element, including uranium, as the second component of our mixture to be halogenated. This group includes molybdenum, tungsten, and uranium. Other salts which may be used as a second part of our mixture to be halogenated, however, include $Nb_2O_5$, $As_2O_5$, $Sb_2O_5$ and $TiO_2$. The mixture of the two components may be formed in any convenient way known to the art to form thoroughly mixed dry compositions. One method which is particularly suitable for laboratory or other small-scale use comprises the coprecipitation of the hydroxides of the two salts to be used in the mixture, such as plutonium hydroxide and uranium hydroxide. This mixture of hydroxides may be converted to a mixture of the respective oxides by heating, if desired.

The reaction of the mixed oxygen-containing salts and the halogenating agent may be carried out by conventional methods. For example, where bromine trifluoride is used as the halogenating agent, the mixture of oxygen-containing salts may be placed in a suitable container, such as prefluorinated nickel or aluminum, and then contacted with liquid $BrF_3$. With this agent it is important that the reaction be carried out under anhydrous conditions, since $BrF_3$ reacts vigorously with water. It is therefore desirable that the reaction be carried out in a closed container either under vacuum conditions or with an inert atmosphere. One method of accomplishing this is to pass $BrF_3$ vapor into a condensing chamber containing the oxysalt. Upon condensation of the $BrF_3$ upon the salt mixture, the chamber may be warmed to a suitable temperature, for example 60–120° C., to drive the reaction to completion.

Other convenient methods of carrying out the reaction, however, may be used, such as dropping the mixture into liquid $BrF_3$. Upon completion of the reaction, the excess $BrF_3$ and the volatile fluoride component of the salt mixture may be volatilized off; for example, where the salt mixture is a mixture of oxides of plutonium and uranium, the uranium will form $UF_6$ which is volatile at about 60° C., whereas the plutonium fluoride is non-volatile up to much higher temperatures, so that the $UF_6$ and excess $BrF_3$ can readily be separated from the non-volatile $PuF_4$ by conventional distillation methods. In addition, impurities which occur with the oxides are often of a type which form volatile fluorides and these volatile fluorides can also be separated from the desired product by the distillation step.

The process of our invention may be further illustrated by the description of the examples which follow.

Example I

A sample of zirconia ($ZrO_2$) was ignited. This sample was then introduced into 2 cc. of bromine trifluoride contained in a quartz reaction chamber, said chamber being connected through two cold traps to a vacuum pump. The $BrF_3$ had been cooled with ice to a temperature of about 0° C. No immediate reaction was observed. The reaction chamber was maintained at room temperature for two days and then was heated to about 100° C. for five minutes. The $BrF_3$ was then removed from the reaction chamber by volatilization methods and the residue which remained in the chamber was analyzed by X-ray and found to be $ZrO_2$, indicating that no reaction had occurred.

A second experiment was carried out in which a mixture of $U_3O_8$ and $ZrO_2$ containing 100 mg. $U_3O_8$ and 13 mg. $ZrO_2$ was dropped into approximately 2 cc. of frozen $BrF_3$ contained in a quartz reaction tube. The tube was then placed on a vacuum line containing two cold traps and the reaction chamber then evacuated. After the evacuation, the reaction chamber was warmed to about 60° C. and a vigorous but not too violent reaction took place with considerable bubbling. When the reaction subsided, helium was admitted to the chamber and the reaction chamber then heated sufficiently to boil the $BrF_3$. The excess $BrF_3$, and $Br_2$ and $UF_6$ were removed from the chamber by volatilization methods, leaving a white residue in the reaction chamber. The residue was analyzed by X-ray methods and found to be $ZrF_4$.

Example II

A mixed sample of plutonium and uranium hydroxide was prepared by precipitating the hydroxides with $NH_4OH$. The sample contained 2 mg. plutonium and 10 mg. uranium. After drying, the sample was ignited at 800° C. The sample was then introduced into the reaction chamber of a reflux condenser and refluxed for 20 minutes with $BrF_3$. The excess $BrF_3$ and volatile products of the reaction were then removed from the chamber and the residue placed in an X-ray capillary tube and analyzed by X-ray methods. The residue was found to be $PuF_4$.

It will be understood that the above-described methods of producing the non-volatile fluorides of zirconium-type elements from the oxysalt are merely illustrative, inasmuch as other modifications of these methods will be apparent to those skilled in the art without departing from the spirit of the invention or the scope of the appended claims.

What is claimed is:

1. The method of producing a non-volatile fluoride of a zirconium-type metal of the group consisting of zirconium, hafnium, thorium, neptunium and plutonium which comprises treating a mixture of an oxide of said zirconium-type element and an oxide of a molybdenum-type element of the group consisting of molybdenum, tungsten and uranium, with bromine trifluoride.

2. The process of claim 1 in which the zirconium-type oxide compound is $ZrO_2$.

3. The process of claim 1 in which the zirconium-type oxide is $ThO_2$.

4. The process of claim 1 in which the zirconium-type oxide is $PuO_2$.

5. The process of claim 1 in which the molybdenum-type oxide is $U_3O_8$.

6. The process of claim 1 in which the molybdenum-type oxide is $MoO_3$.

7. The method of preparing zirconium tetrafluoride which comprises treating a mixture of $ZrO_2$ and $U_3O_8$ with bromine trifluoride under substantially anhydrous conditions and a temperature of 60–120° C. whereby the $U_3O_8$ is converted to $UF_6$ and the $ZrO_2$ is converted to $ZrF_4$.

References Cited in the file of this patent

Emelius et al.: "Journal of the Chemical Society" (London), 1950, pages 164–168.